US012194838B2

(12) United States Patent
Bochicchio De Maria et al.

(10) Patent No.: US 12,194,838 B2
(45) Date of Patent: Jan. 14, 2025

(54) VEHICLE HAVING A FRAME PROVIDED WITH A SUPPORTING STRUCTURE FOR AUXILIARY UNITS, IN PARTICULAR GAS TANKS OR ELECTRIC BATTERIES

(71) Applicant: C.R.F. Società Consortile per Azioni, Orbassano (IT)

(72) Inventors: Mario Bochicchio De Maria, Orbassano (IT); Dino De Stefano, Orbassano (IT); Fabrizio Urbinati, Orbassano (IT); Roberto Puppini, Orbassano (IT)

(73) Assignee: C.R.F. Società Consortile per Azioni, Orbassano Torino (IT)

( * ) Notice: Subject to any disclaimer, the term of this patent is extended or adjusted under 35 U.S.C. 154(b) by 753 days.

(21) Appl. No.: 17/421,093

(22) PCT Filed: Aug. 13, 2019

(86) PCT No.: PCT/IB2019/056857
§ 371 (c)(1),
(2) Date: Jul. 7, 2021

(87) PCT Pub. No.: WO2020/144498
PCT Pub. Date: Jul. 16, 2020

(65) Prior Publication Data
US 2022/0105799 A1 Apr. 7, 2022

(30) Foreign Application Priority Data
Jan. 9, 2019 (EP) .................................... 19150888

(51) Int. Cl.
*B60K 15/07* (2006.01)
*B60K 15/03* (2006.01)
(Continued)

(52) U.S. Cl.
CPC ........ *B60K 15/07* (2013.01); *B60K 15/03006* (2013.01); *B62D 21/02* (2013.01); *B60K 2015/0634* (2013.01)

(58) Field of Classification Search
CPC .................. B60K 15/067; B60K 15/07; B60K 15/03006; B60K 2015/063;
(Continued)

(56) References Cited

U.S. PATENT DOCUMENTS

2004/0148778 A1   8/2004  Fleming
2005/0062251 A1   3/2005  Ramsey
2011/0259933 A1*  10/2011 Dossow ............... B60K 15/067
                                                          224/538

FOREIGN PATENT DOCUMENTS

DE     202010008375 U1 *  1/2012 ............. B62D 21/02
EP          3296186 A1     3/2018
(Continued)

OTHER PUBLICATIONS

Translation of DE-202010008375-U1 (Year: 2012).*
International Search Report and Written Opinion dated Dec. 2, 2019. 21 pages.

*Primary Examiner* — Christopher B Wehrly
(74) *Attorney, Agent, or Firm* — RMCK Law Group PLC

(57) ABSTRACT

A light duty vehicle includes a vehicle frame, including a pair of vehicle longitudinal beams connected to each other by a plurality of cross-members and a cabin frame, having a pair of cabin longitudinal beams rigidly connected to front ends of the vehicle longitudinal beams. A supporting structure for auxiliary units, such as gaseous fuel tanks or electric batteries, which is carried by the vehicle frame, and includes an auxiliary frame extending between the vehicle longitudinal beams and having connection plates arranged in vertical planes parallel to a longitudinal direction of the vehicle frame and which are in contact with mutually facing inner
(Continued)

Figure 1:
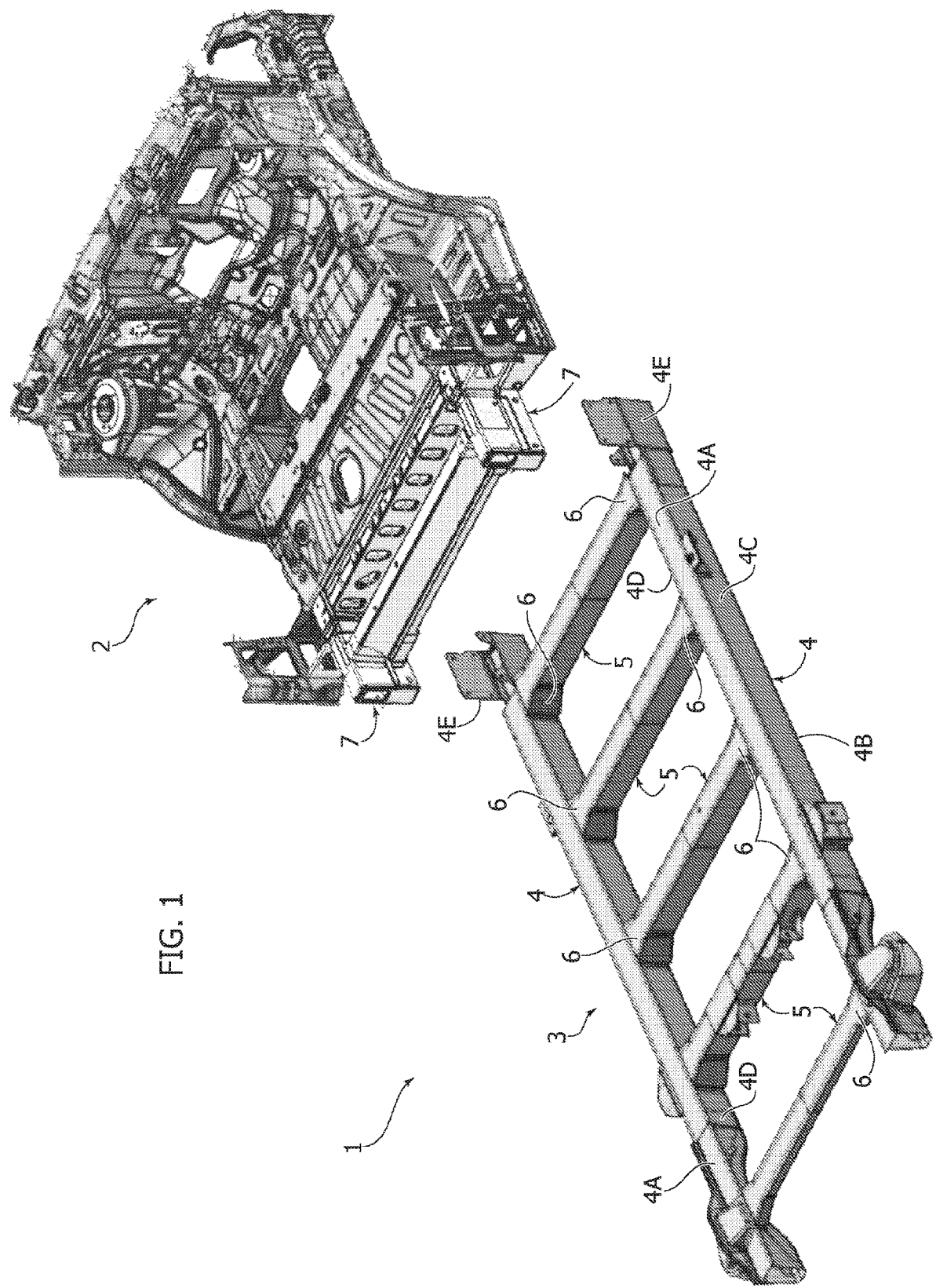

lateral walls of the vehicle longitudinal beams and are rigidly connected to these longitudinal beams. The auxiliary frame fulfills a structural function equivalent to the structural function of one or more cross-members at an area of the vehicle frame where the cross-members are omitted.

5 Claims, 4 Drawing Sheets

(51) Int. Cl.
  *B60K 15/063* (2006.01)
  *B62D 21/02* (2006.01)
(58) Field of Classification Search
  CPC .. B60K 2015/0634; B60K 1/04; B60K 1/438; B62D 21/02; B62D 21/12
  See application file for complete search history.

(56) References Cited

FOREIGN PATENT DOCUMENTS

| | | | |
|---|---|---|---|
| JP | 2017039362 | A | 2/2017 |
| WO | 2018144780 | A1 | 8/2018 |

* cited by examiner

VEHICLE HAVING A FRAME PROVIDED WITH A SUPPORTING STRUCTURE FOR AUXILIARY UNITS, IN PARTICULAR GAS TANKS OR ELECTRIC BATTERIES

CROSS-REFERENCE TO RELATED APPLICATIONS

This application is a 371 National Stage of International Application No. PCT/IB2019/056857, filed Aug. 13, 2019, which claims priority to European Patent Application No. 19150888.6 filed Jan. 9, 2019. The disclosure of each of the above applications is incorporated herein by reference in its entirety.

FIELD OF THE INVENTION

The present invention relates to vehicles, and in particular to light duty vehicles of the type comprising:
- a vehicle frame (3), comprising a pair of longitudinal beams (4) connected to each other by a plurality of cross-members (5),
- a cabin frame (2), comprising a pair of longitudinal beams (7) rigidly connected to the front ends of the longitudinal beams (4) of the vehicle frame (3),
- at least one supporting structure (8) for auxiliary units (9) such as gaseous fuel tanks or electric batteries, carried by the vehicle frame (3), said vehicle being characterized in that:
said supporting structure (8) for supporting the auxiliary units (9) comprises an auxiliary frame (80) which extends between the longitudinal beams (4) of the vehicle frame (3) and has at least two connection plates (P) arranged in vertical planes parallel to the longitudinal direction of the vehicle (3),
said connection plates (P) of the auxiliary frame (80) are in contact with mutually facing inner lateral walls (4D) of said longitudinal beams (4) of the vehicle frame (3) and are rigidly connected to said longitudinal beams (4) of the vehicle frame (3),
so that said auxiliary frame (80) fulfills a structural function equivalent to the structural function of one or more of said cross-members (5) at an area of the vehicle frame (3) where said cross-members (5) are not provided or are omitted for leaving space for the auxiliary frame, and are therefore replaced by the latter,

PRIOR ART

A vehicle of the above indicated type is known from DE 20 2010 008375 U1. Similar solutions are also known from EP 3 296 186 A1 and US 2005/062251 A1.

OBJECT OF THE INVENTION

The object of the present invention is that of providing a vehicle of the above indicated type having an extremely resistant and reliable structure which at the same time has a simple construction and implies relatively reduced production costs.

SUMMARY OF THE INVENTION

In view of achieving this object, the invention provides a vehicle having the features which have been indicated in the foregoing and further characterized in that the above-mentioned connection plates of the auxiliary frame which are arranged at vertical planes parallel to the longitudinal direction of the vehicle frame are provided with flanges which project therefrom and constitute abutment elements which are in abutting contact with the lower walls of the two longitudinal beams of the vehicle frame, and In that the auxiliary frame has a quadrangular configuration, including two longitudinal arms and two transverse arms rigidly connected to each other and further comprising at least one cross-member which connects the longitudinal arms to each other and has ends carrying said connection plates arranged at vertical planes parallel to the longitudinal direction of the vehicle frame.

In the case of a preferred embodiment, said cross-member of the auxiliary frame is in form of a hollow beam, with an upper wall, a lower wall, two lateral walls and end surfaces to which said connection plates are rigidly connected. The connection plates have portions projecting with respect to the cross-section of the cross-member, which are provided with holes or threaded bushes for engagement of screws for a rigid connection to the longitudinal beams of the vehicle frame.

A specific application of the above-described structure is that of the housing of a plurality of tanks for gaseous fuel having a substantially cylindrical shape. In the case of this application, said at least one cross-member of the auxiliary frame has concave lateral walls configured for defining a seat for respective gas tanks arranged in a horizontal position, with their axes arranged transversely to the longitudinal direction of the vehicle frame. In this case, to each lateral wall of the cross-member of the auxiliary frame there are associated belts for securing the gas tanks to the auxiliary frame.

According to a further preferred feature, the vehicle further comprises a counter-frame comprising a pair of longitudinal beams extending above the longitudinal beams of the vehicle frame and rigidly connected thereto, and a plurality of cross-members which connect the longitudinal beams of the counter-frame to each other, said counter-frame acting as a spacer element in order to avoid a direct contact of the gas tanks with a floor panel of the vehicle.

Due to the above mentioned features, the auxiliary frame ensures a stable support for the auxiliary units, in particular for the tanks of gaseous fuel. At the same time, the auxiliary frame is integrated within the vehicle frame so as to act as a structural element of the frame, adapted to give a contribution to the resistance of the frame against deformation. Therefore, at the area where the auxiliary frame is integrated within the vehicle frame, the latter does not have cross-members connecting the longitudinal beams, since the function of these cross-members is fulfilled by said auxiliary frame, which acts as a structural element adapted to counteract deformations, in particular twisting deformations, of the vehicle frame, similarly to, or even better than, what is normally achieved with the cross-members which connect the longitudinal beams of the vehicle frame to each other.

A further advantage of the above-described structure lies in that assembling of the vehicle can be performed with extremely simple and quick operations. In the case for example of tanks for gaseous fuel, the tanks can be preassembled on the auxiliary frame, after which the unit constituted by the auxiliary frame with the fuel tanks preliminarily assembled thereon is mounted on the vehicle frame, by moving the unit towards the vehicle frame from below, until to obtain an abutment contact of the above-mentioned flanges acting as abutment elements, against the lower walls of the longitudinal beams of the frame. In this condition the auxiliary frame is arranged between the two longitudinal beams, with the above-mentioned connection plates arranged at the ends of the transverse elements of the auxiliary frame in contact with the facing inner walls of the longitudinal beams. In this condition, the auxiliary frame carrying the gas tanks can be secured to the longitudinal beams of the vehicle frame.

The structure of the vehicle can be also provided with more than one auxiliary frame, each auxiliary frame being arranged with one or more auxiliary units, such as gas tanks or electric batteries.

DETAILED DESCRIPTION OF THE INVENTION

Figure 2:
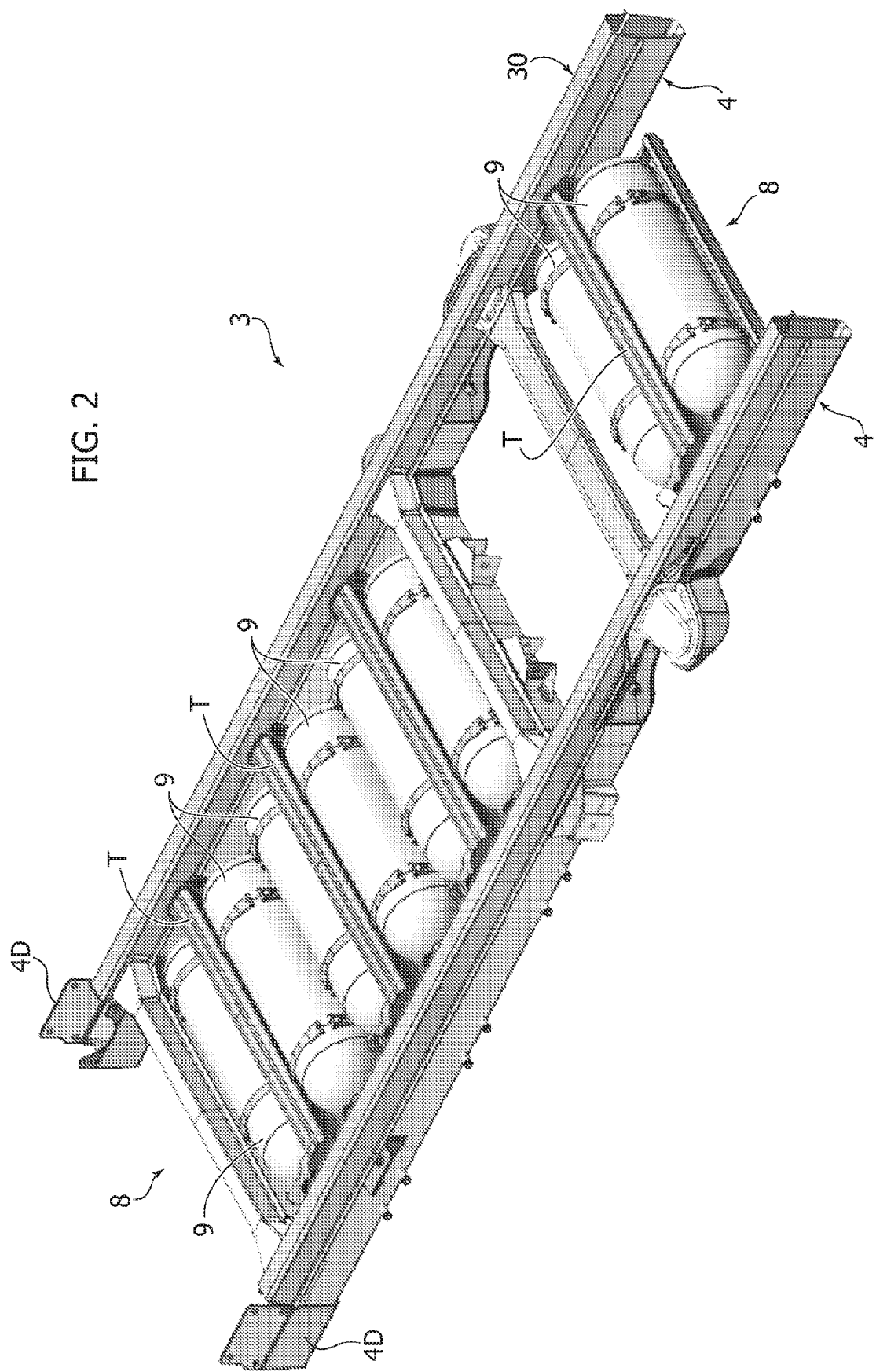
Figure 3:
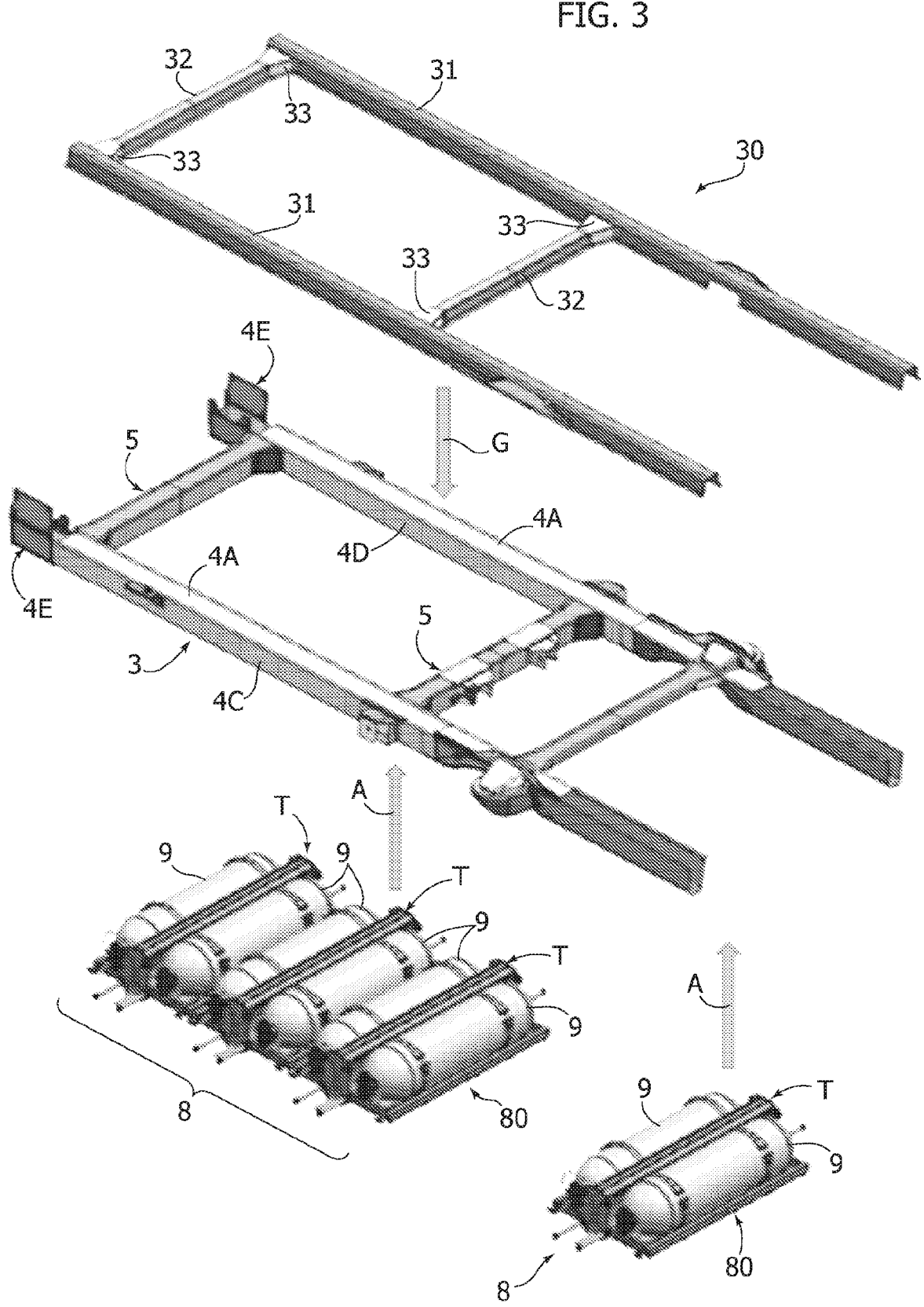
Figure 4:
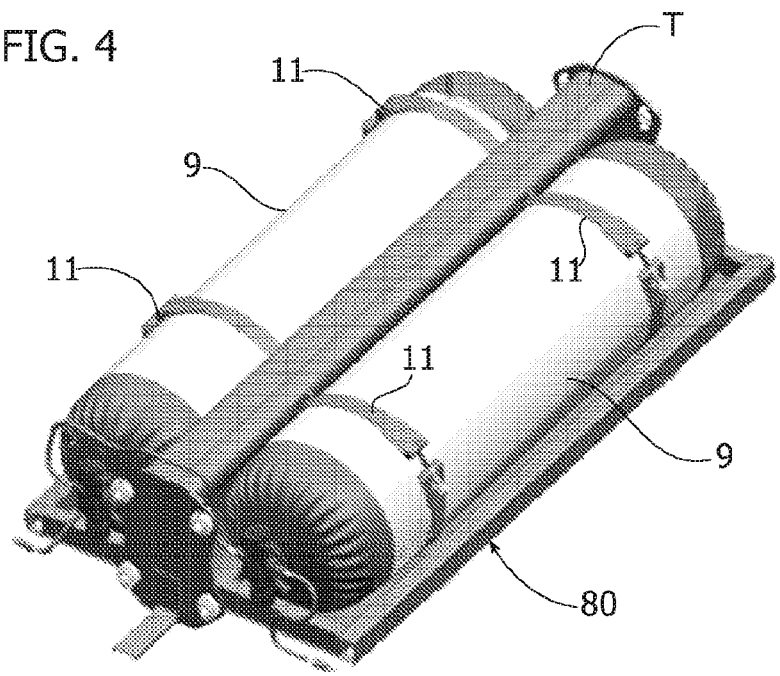
Figure 5:
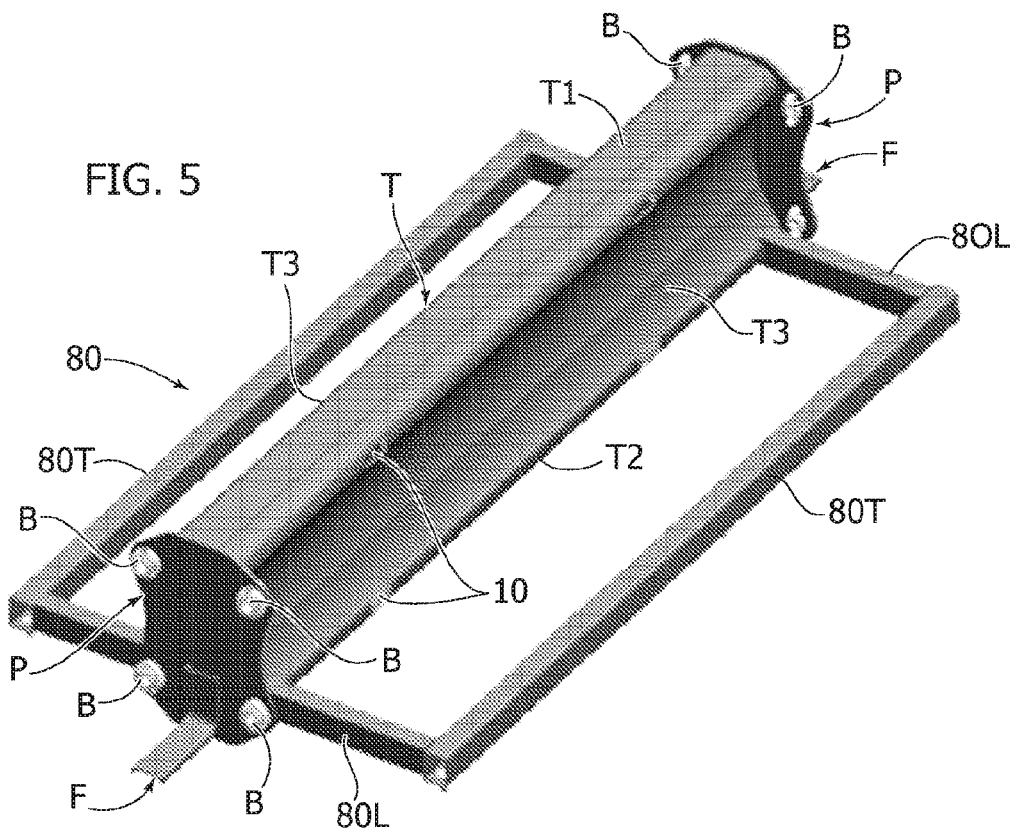

Further features and advantages of the invention will become apparent from the description which follows with reference to the annexed drawings, given purely by way of non-limiting example, in which:

FIG. 1 is an exploded perspective view of the supporting structure of a light duty vehicle, including a cabin frame and a vehicle frame, FIG. 2 shows the vehicle frame of FIG. 1 transformed according to the teachings of the present invention by replacing some cross-members of the vehicle frame with assemblies supporting auxiliary units, in the illustrated example gas tanks, FIG. 3 is an exploded perspective view of the structure of FIG. 2, FIG. 4 is a perspective view of a detail of FIG. 3 at an enlarged scale, and FIG. 5 is a perspective view at an enlarged scale of the auxiliary frame forming part of the assembly of FIG. 4.

In FIG. 1, reference numeral 1 generally designates the supporting structure of a light duty vehicle, including a cabin frame 2 and a vehicle frame 3. A vehicle frame 3 comprises a pair of longitudinal beams 4 connected to each other by a plurality of cross-members 5.

In the case of the present invention, the longitudinal beams 4 of the vehicle frame 3 have a hollow structure of welded sheet metal, with an upper wall 4A, a lower wall 4B, two outer lateral walls 4C and two inner lateral walls 4D. At least some of the cross-members 5 also have a hollow structure of welded sheet metal, including an upper wall, a lower wall and two lateral walls. In the case of the illustrated example, the ends of the cross-members 5 are rigidly connected to the longitudinal beams 4 of the vehicle frame 3 by means of intermediate supports 6 which are welded both to the cross-members 5 and the longitudinal beams 4. The cabin frame 2 can be made in any known way, but in any case comprises a pair of longitudinal beams 7 which are rigidly connected, for example by welding, to the front ends of the longitudinal beams 4 of the vehicle frame 3. To this end, in the illustrated example, the front ends of the longitudinal beams have coupling portions 4E having a U-shape which are engaged around the rear ends of the longitudinal beams 7 of the cabin frame 2.

According to the present invention, some of the cross-members 5 of the vehicle frame 3 shown in FIG. 1 are replaced by assemblies 8 (see for example FIG. 3) for supporting tanks 9 for gaseous fuel (in particular CNG), which are in the form of substantially cylindrical containers, arranged in a horizontal position, with their axis directed transversely with respect to the longitudinal direction of the vehicle frame 3.

As shown in FIG. 3, the vehicle frame 3 is substantially identical to the frame 3 which has been described with reference to FIG. 1, except for that cross-members 5 are omitted at the areas where the assemblies 8 must be mounted.

In FIGS. 2, 3, the parts in common to those of FIG. 1 are designated by the same reference numerals. In the example illustrated herein, the vehicle frame is provided with a first assembly 8 for supporting three pairs of tanks 9, and a further assembly 8 for supporting a single pair of tanks 9. It is clearly apparent that this arrangement is illustrated herein purely by way of non-limiting example. A vehicle frame can be indeed provided with any number of assemblies 8 (also a single assembly) and each assembly 8 can be provided for supporting any number of tanks 9.

Each assembly 8 includes an auxiliary frame 80 which supports the tanks 9 and is rigidly connected to the vehicle frame 3.

FIG. 5 shows a perspective view of the frame 80 of an assembly 8 which supports a pair of tanks 9. In this embodiment, the auxiliary frame 80 has a quadrangular configuration, with two longitudinal arms 80L and two transverse arms 80T rigidly connected to each other. In the illustrated example, each of these arms is in the form of a metal bar with a square cross-section, so as to define a very rigid frame. Also with reference to FIG. 5, the central portions of the two longitudinal arms 80L are connected to each after by a cross-member T which in the illustrated example is in the form of a hollow beam of welded sheet metal. The cross-member T has an upper wall T1, a lower wall T2 and two lateral walls T3. To the end surfaces of the cross-members T there are welded two connection plates P arranged at a vertical planes parallel to the longitudinal direction of the vehicle frame and having lugs projecting from the cross-section of the cross-members T, which are provided with holes or threaded bushes B, for engagement of screws for a rigid connection to the longitudinal beams 4 of the vehicle frame 3. In the assembled condition (FIG. 2) the connection plates P are in contact with the inner walls 4D of the longitudinal beam 4 of the vehicle frame 3 which are facing towards each other.

As diagrammatically shown by the arrows A in FIG. 3, the assemblies 8 are assembled from below on the vehicle frame 3.

Two flanges F axially project outwardly from the connection plates P of each cross-member T, these flanges acting as abutment elements adapted to engage the lower walls 4B of the two longitudinal beams 4 of the vehicle frame 3. In the specific example illustrated herein, each flange F is constituted by a flat portion of an L-shaped element welded to the respective plate P.

With reference to FIG. 3, in the case of the example illustrated herein, the vehicle frame 3 is provided, as indicated in the foregoing, both with an assembly 8 carrying a single pair of tanks 9 and with an assembly 8 carrying three pairs of tanks 9. This latter assembly also has an auxiliary frame 80 similar to that which has been described above with reference to FIG. 5, except for that the longitudinal beams 80L have a longer extension and are connected to each other by many cross-members T. It is also absolutely possible, in place of a single frame 80 carrying the three pairs of tanks 9, to provide three frames 80 of the type shown in FIG. 5, located at positions adjacent to each other.

An important feature of the present invention lies in that, due to the structure and the arrangement which have been described above, each auxiliary frame 80 fulfills a structural strengthening function for the vehicle frame 3 which is absolutely similar to, or even more effective than, the structural function fulfilled by the cross-members 5 of the vehicle frame. As already indicated, in the area where the assemblies are provided, the cross-members 5 are omitted, but each auxiliary frame 80 is able to fulfills the same function, due to the rigid configuration of this frame and due to the connection which has been described above between the ends of the cross-members T and the longitudinal beams 4. In particular, the auxiliary frames 80 contribute to counteract the deformations of the frame 3 and above all they prevent undesired twisting deformations of this frame.

In this manner, the auxiliary frames 80 carrying the gas tanks 9 also fulfill a safety function, by absorbing impact energy in the case of a vehicle collision.

With specific reference to the example in which each assembly 8 carries gas tanks having the cylindrical configuration which has been described above, the lateral walls T3 of each beam T have a concave shape with a curved profile, so as to define a seat for the body of the adjacent tank 9. Furthermore, each wall T3 has slots 10 through which securing metal belts 11 (FIG. 4) can be engaged, for securing the tanks 9 to the frames 80.

In the case of the specific example illustrated herein, to the vehicle frame 3 there is associated also a counter-frame 30, comprising a pair of longitudinal beams 31 connected to each other by cross-members 32. The longitudinal beams 31 are arranged above and along the longitudinal beam 4 of the vehicle frame 3 and are rigidly connected thereto, for example by means of screws or by welding, in the case of the illustrated example, also the cross-members 32 are connected to the longitudinal beams 31 with the interposition of intermediate supports 33, each of which is welded both to the longitudinal beams and to the cross-members 32.

The counter-frame 30 is assembled from above (see arrow G in FIG. 3) on the vehicle frame 3. As shown in FIG. 2, in the assembled condition, the counter-frame 3 acts as a spacer adapted to prevent a direct contact of the floor panel of the vehicle with the gas tanks 9.

As indicated in the foregoing, the invention is applicable also to the support of auxiliary units different from gas tanks, such as to the support of electric batteries.

Naturally, while the principle of the invention remains the same, the details of construction and the embodiments may widely vary with respect to what has been described and shown purely by way of example, without departing from the scope of the present invention.

The invention claimed is:

1. A light duty vehicle, comprising:
   a vehicle frame, comprising a first pair of longitudinal beams connected to each other by a plurality of cross-members,
   a cabin frame, comprising a second pair of longitudinal beams rigidly connected to front ends of the first pair of longitudinal beams of the vehicle frame,
   at least one supporting structure for auxiliary units carried by the vehicle frame,
   said supporting structure for supporting the auxiliary units comprises an auxiliary frame which extends between the first pair of longitudinal beams of the vehicle frame and has at least two connection plates arranged in vertical planes parallel to a longitudinal direction of the vehicle,
   said connection plates of the auxiliary frame are in contact with mutually facing inner lateral walls of said first pair of longitudinal beams of the vehicle frame and are rigidly connected to said first pair of longitudinal beams of the vehicle frame,
   so that said auxiliary frame fulfills a structural function equivalent to the structural function of one or more of said plurality of cross-members at an area of the vehicle frame where said plurality of cross-members are not provided or are omitted for leaving space for the auxiliary frame, and are therefore replaced by the latter,
   wherein said connection plates of the auxiliary frame are provided with flanges which project from said connection plates and constitute abutment elements in engagement against lower walls of the first pair of longitudinal beams of the vehicle frame,
   wherein the auxiliary frame has a quadrangular configuration including two longitudinal arms and two transverse arms rigidly connected to each other and further comprising at least one cross-member which connects the two longitudinal arms to each other and which has its ends carrying said connection plates arranged in vertical planes parallel to the longitudinal direction of the vehicle frame, and
   wherein said at least one cross-member of the auxiliary frame is in a form of a hollow beam, with an upper wall, a lower wall, two lateral walls and end surfaces to which said connection plates are rigidly connected.

2. The vehicle according to claim 1, wherein said connection plates have portions projecting outwardly with respect to a cross-section of the at least one cross-member which are provided with holes or threaded bushes for engagement of screws for rigid connection to the first pair of longitudinal beams of the vehicle frame.

3. The vehicle according to claim 1, which is for housing a plurality of gaseous fuel tanks having a substantially cylindrical shape, wherein said at least one cross-member of the auxiliary frame has concave lateral walls configured for defining a seat for respective gaseous fuel tanks arranged in a horizontal position with their axes arranged transversely to the longitudinal direction of the vehicle frame, and
   wherein securing belts, for securing the plurality of gaseous fuel tanks to the auxiliary frame, are associated to each lateral wall.

4. The vehicle according to claim 3, wherein the vehicle comprises a counter-frame comprising a third pair of longitudinal beams extending above the first pair of longitudinal beams of the vehicle frame, and rigidly connected thereto, and another plurality of cross-members which connect the third pair of longitudinal beams of the counter-frame to each other, said counter-frame acting as a spacer element for avoiding a direct contact of the plurality of gaseous fuel tanks with a vehicle floor panel.

5. The vehicle according to claim 3, wherein the vehicle comprises one or more auxiliary frames, each auxiliary frame being provided for supporting one or more of the plurality of gaseous fuel tanks.

* * * * *